United States Patent
Pease et al.

(10) Patent No.: US 6,522,459 B1
(45) Date of Patent: Feb. 18, 2003

(54) TEMPERATURE CONTROL AND MONITORING OF OPTICAL DETECTOR COMPONENTS IN AN OPTICAL COMMUNICATION SYSTEM

(75) Inventors: John S. Pease, Santa Clara, CA (US); Michael J. Gassner, San Jose, CA (US); Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 92 days.

(21) Appl. No.: 09/789,877

(22) Filed: Feb. 22, 2001

(51) Int. Cl.$^7$ .................................................. H01S 3/00
(52) U.S. Cl. ..................................... 359/341.4; 359/337
(58) Field of Search ........................... 359/341.1, 341.4, 359/337

(56) References Cited

U.S. PATENT DOCUMENTS

| | | | |
|---|---|---|---|
| 4,918,396 A | 4/1990 | Halemane et al. | 330/4.3 |
| 5,131,062 A * | 7/1992 | Eide et al. | 385/12 |
| 5,321,541 A | 6/1994 | Cohen | 359/127 |
| 5,513,029 A | 4/1996 | Roberts | 359/177 |
| 5,654,816 A | 8/1997 | Fishman | 359/177 |
| 5,655,068 A | 8/1997 | Opoczynski | 395/182.02 |
| 5,673,280 A | 9/1997 | Grupp et al. | 372/3 |
| 5,859,938 A | 1/1999 | Nabeyama et al. | 385/24 |
| 5,900,969 A | 5/1999 | Srivastava et al. | 359/341 |
| 6,049,413 A | 4/2000 | Taylor et al. | 359/337 |
| 6,061,171 A | 5/2000 | Taylor et al. | 359/341 |
| 6,081,366 A | 6/2000 | Kidorf et al. | 359/341 |
| 6,094,298 A | 7/2000 | Luo et al. | 359/346 |
| 6,104,526 A * | 8/2000 | Kakui | 359/337 |
| 6,115,174 A | 9/2000 | Grubb et al. | 359/334 |
| 6,134,047 A | 10/2000 | Flood et al. | 359/341 |
| 6,178,038 B1 | 1/2001 | Taylor et al. | 359/341 |
| 6,198,572 B1 | 3/2001 | Sugaya et al. | 359/337 |
| 6,215,581 B1 | 4/2001 | Yadlowsky | 359/337 |
| 6,335,821 B1 * | 1/2002 | Suzuki et al. | 359/337.11 |

FOREIGN PATENT DOCUMENTS

| | | | |
|---|---|---|---|
| JP | 2000299518 A | * | 10/2000 |
| JP | 02001255423 A | * | 9/2001 |
| WO | WO 00/14909 | | 3/2000 |
| WO | WO 00/49721 | | 8/2000 |

OTHER PUBLICATIONS

Sun et al. "Optical Fiber Amplifiers for WDM Optical Networks" Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al. "Active Gain Tilt Equalization by Preferentially 1.43$\mu$m—or 1.48$\mu$m—Pumped Raman Amplification" OSA Optical Amplifiers and their Applications, vol. 30, p. 101–105 (1999).

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

(List continued on next page.)

*Primary Examiner*—Mark Hellner
(74) *Attorney, Agent, or Firm*—Fish & Neave; G. Victor Treyz (57) ABSTRACT

Optical detector components in a fiber-optic communication system are temperature stabilized. The optical detector components may be part of an optical amplifier, a receiver, or other optical device. A temperature-controlled housing may be used to stabilize the temperature of a photodiode and/or a transimpedance amplifier of the optical detector. The housing may additionally be used to stabilize the temperature of the coils of a fiber optic amplifier and possibly other components.

29 Claims, 5 Drawing Sheets

OTHER PUBLICATIONS

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Nortel Networks Datasheet "MGM Multiwavelength Gain Module" (Nov. 3, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

TEMPERATURE CONTROL AND MONITORING OF OPTICAL DETECTOR COMPONENTS IN AN OPTICAL COMMUNICATION SYSTEM

BACKGROUND OF THE INVENTION

The present invention relates to fiber-optic communication systems, and more particularly, to ways in which to monitor and control the operating temperature of optical detector components for use in fiber-optic communications systems.

Fiber-optic communications systems typically use optical amplifiers to amplify optical signals that have traveled over multi-kilometer fiber-optic transmission links. A typical optical amplifier may be based on fiber that has been doped with rare-earth elements such as erbium. Fiber amplifiers are typically pumped by diode lasers.

Because the gain spectra of erbium-doped fiber varies as a function of temperature, erbium-doped fiber amplifier coils are sometimes temperature stabilized by heating them to an elevated temperature. A fiber amplifier may be designed to operate within a temperature range of 0 to 70° C. Temperature-stabilization schemes have generally used heaters that maintain fiber amplifiers at the maximum temperature in the fiber amplifier's operating range (i.e., at 70° C.). If the environmental temperature falls below the maximum operating temperature, such a heater can be used to ensure that the temperature of the doped fiber coil is maintained at the maximum temperature. This ensures temperature stability and prevents drift in the spectral characteristics of the fiber amplifier's gain.

In addition to the fiber coil, other components of the optical communication system may be sensitive to temperature changes. For example, components of an optical detector, such as a photodiode and a transimpedance amplifier, may be affected by temperature changes. The transimpedance amplifier may be configured to produce a relatively low output voltage (e.g., 0–500 mV). This low voltage may be amplified to a relatively high voltage level (e.g., 0–5 V) by a gain stage. The gain stage may be external to the transimpedance amplifier or may be internal to the transimpedance amplifier. The gain stage (whether internal or external) may also be affected by the temperature changes that influence the operation of the photodetector.

It is therefore an object of the present invention to ensure temperature stability of an optical detector in a fiber-optic communication system and prevent drift in the spectral characteristics of the detector's gain.

It is also an object of the present invention to provide ways in which to monitor and control the temperature of optical detector components in a fiber-optic communication system.

SUMMARY OF THE INVENTION

These and other objects of the invention are accomplished in accordance with the principles of the present invention by providing a housing that allows optical detector components to be maintained at stable temperatures during operation. The optical detector components may be stabilized at relatively low temperatures to improve performance. As an example, the optical detector components may be temperature-stabilized at about room temperature. Of course, the optical detector components may be stabilized at other temperatures that improve the performance of the detector components or the overall performance of devices within the housing.

According to one exemplary embodiment, the optical detector may be provided in an optical amplifier module. The optical detector may be used to monitor an optical signal input to and/or output from the optical amplifier. The output of the optical detector may be used to control a pump laser for a doped fiber coil used for optical amplification. The optical detector may include a photodiode (such as a PIN diode) and a transimpedance amplifier. The photodiode and/or the transimpedance amplifier may be provided in a temperature-controlled housing that maintains the components at a stable operating temperature. One or more additional components of the amplifier module, such as the doped fiber coil, may be provided in the temperature-controlled housing as well.

The transimpedance amplifier may be configured to produce a relatively low output voltage (e.g., 0–500 mV). This low voltage may be amplified to a relatively high voltage level (e.g., 0–5 V) by a gain stage. The gain stage may be external to the transimpedance amplifier or may be internal to the transimpedance amplifier. The gain stage (whether internal or external) may also be affected by the temperature changes that influence the operation of the photodetector. Accordingly, the gain stage may also be provided in a temperature-controlled housing.

The temperature-controlled housing may include insulation to help ensure that proper temperatures are maintained. When proper insulation is provided elsewhere in the amplifier module or other optical network module in which the components are used or when less critical temperature control capabilities are acceptable, the components that are to be temperature controlled may be mounted directly to a thermoelectric cooling element or other temperature controller without using a housing.

According to a further exemplary embodiment, the optical detector may be provided at a network node, for example, as part of an optical receiver for the optical transmission signal. The optical receiver may include, for example, a demultiplexer, a photodiode, a transimpedance amplifier, an analog-to-digital converter, and a temperature-controlled housing. The temperature-controlled housing may house the photodiode and/or the transimpedance amplifier, among other components, to maintain the housed equipment at a stable operating temperature.

The temperature-controlled housing may be constructed using thermally-insulating materials such as fiberglass, foam, plastic, or any other suitable insulating packaging. Copper or other suitable thermally-conductive materials may be used to distribute heat within the housing. Thermoelectric cooling elements may be used to control the temperature of the housing. The thermo-electric cooling elements may be placed between, for example, a plate of copper within the housing and a heat sink that is external to the housing. The optical detector components may be placed in the vicinity of the copper plate. Ports may be provided through the housing to permit signals to pass into and out of the housing.

The temperature within the housing may be monitored using a temperature sensor based on a thermocouple, a temperature-sensitive resistor, or any other suitable temperature-sensitive element. A local control unit in the fiber amplifier may be used to control the temperature of the thermo-electric cooling units. If the local environmental temperature falls below the temperature set point for the housing, the thermo-electric cooling units may be used to heat the housing. If the local environmental temperature rises above the temperature set point for the housing, the thermo-electric cooling units may be used to cool the housing.

Information on the temperature of the housing that is monitored using the temperature sensor may also be provided to remote monitoring locations. For example, the temperature information may be provided to a central office. A network management facility may gather information such as the information on the temperature of the optical amplifier housing and may, if desired, control the operation of the housing and other fiber-amplifier operations remotely.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
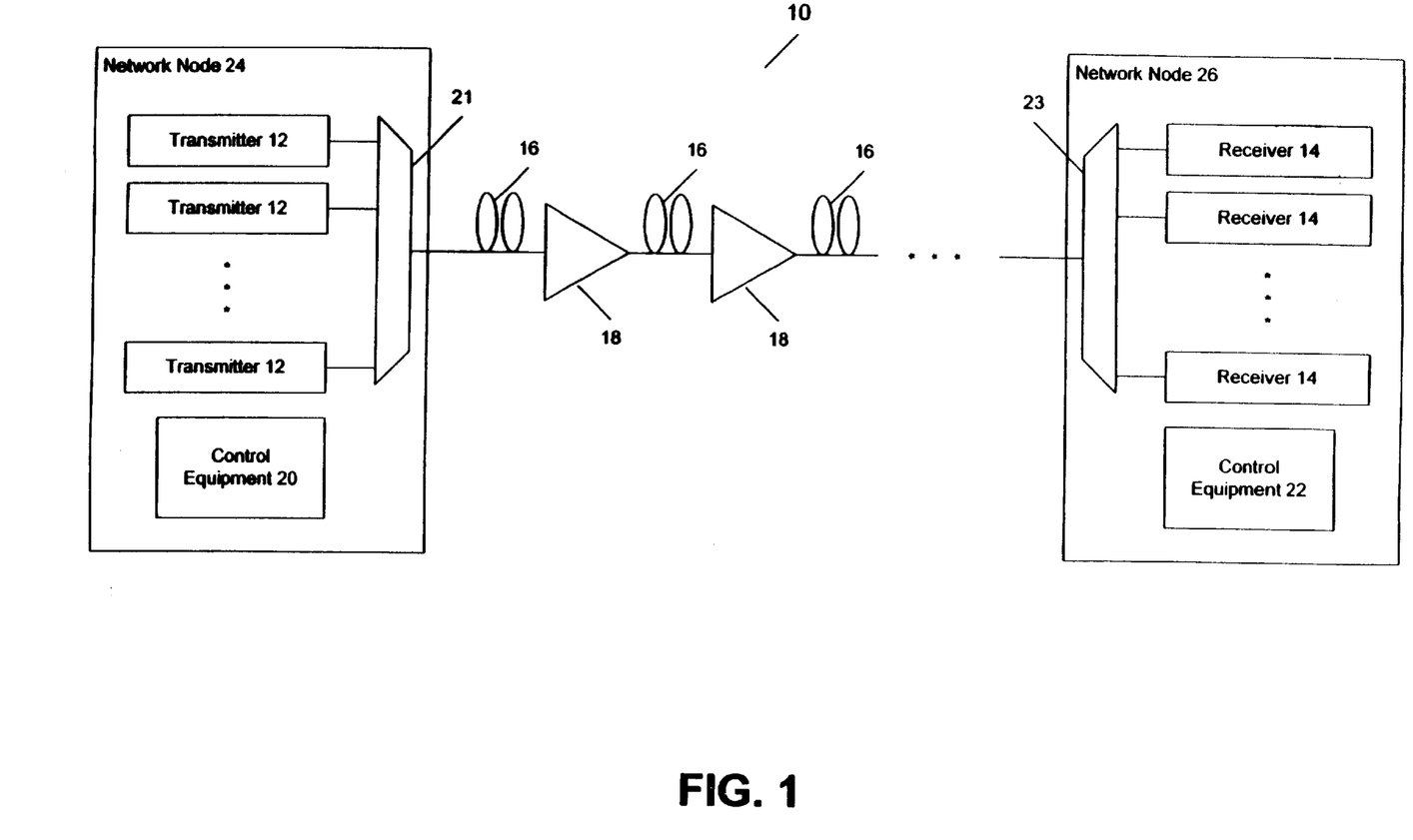
FIG. 1 is a schematic diagram of an illustrative optical communications system link in accordance with the present invention.

An illustrative optical communications link 10 in accordance with the present invention is shown in FIG. 1. As shown in FIG. 1, the optical communications link 10 may be used to support wavelength-division-multiplexing (WDM) arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at higher data rates (e.g., approximately 40 Gbps for OC-768), or a wider range of carrier wavelengths may be supported (e.g., 1480–1610 nm).

More particularly, optical communications link 10 spans a first network node 24 and a second network node 26. Network nodes 24 and 26 may be two nodes of a larger optical communications network system containing any number of nodes. Network node 24 includes a plurality of transmitters 12 and computer equipment 20. Each transmitter 12 generates an optical signal having a different carrier wavelength. For example, the transmitters 12 may be distributed feedback laser diodes operating at different wavelengths. Alternatively, the transmitters 12 may include laser diodes operating at the same wavelength and wavelength converters for converting optical signals from the laser diodes to different carrier wavelengths appropriate for transmission.

The optical signals from transmitters 12 are provided to a wavelength division multiplexer 21, which combines the optical signals to produce WDM optical signals. The wavelength division multiplexer 21 may be, for example, an arrayed waveguide-type or a thin film filter-type multiplexer.

The WDM optical signals may be transmitted over a series of fiber links. Each fiber link may include a span 16 of optical fiber. Fiber spans may be on the order of 40–120 km in length for long-haul networks or may be any other suitable length for use in signal transmission in an optical communications network.

Optical amplifiers 18 may be disposed between spans 16. For example, as optical signals travel along the optical fibers 16, signal strength is attenuated. Accordingly, optical amplifier 18 may amplify the optical signals between successive spans of fiber. Of course, other optical equipment may be provided along the communication link 10. For example, an add/drop module, a switch, a router, a wavelength converter or other optical device, or a combination of the foregoing, may be inserted before or after an optical amplifier 18.

WDM optical signals may be received at network node 26, where they may be demultiplexed into a plurality of optical signals by wavelength division demultiplexer 23. The plurality of output signals may be provided, respectively, to a plurality of receivers 14. Each receiver 14 may include, for example, a PIN diode coupled to transimpedance amplifier.

As noted above, additional optical equipment may be provided between multiplexer 21 and demultiplexer 23. For example, optical switching equipment, routers, and add/drop units, among other equipment, may be provided between multiplexer 21 and demultiplexer 23.

One or more telemetry channels may be used for monitoring and controlling system components, rather than carrying network data traffic. Such telemetry channels may be used, for example, to allow computer equipment such as computer equipment 20 and 22 at network nodes 24 and 26 or at central offices to communicate with system components such as an optical amplifier 18. As an example, a telemetry channel operating at a wavelength of 1510 nm may be used for monitoring and control functions. This is, however, merely illustrative. Any wavelength or wavelengths may be used to support supervisory or network management and control functions if desired.

With the arrangement of FIG. 1, status information from optical amplifiers 18 may be passed to network control and management software running on computer equipment 22 using the telemetry channel. The telemetry channel of a link between node 26 and node 24 that is arranged to support communications in the opposite direction from link 10 may be used to provide this status information to network control and management software running on computer equipment 20.

Control commands for adjusting the operation of optical amplifiers 18 may be generated by the network software running on computer equipment 20. The control commands may be transmitted by a transmitter 12 on the telemetry channel and received by the appropriate amplifier 18.

Figure 2:
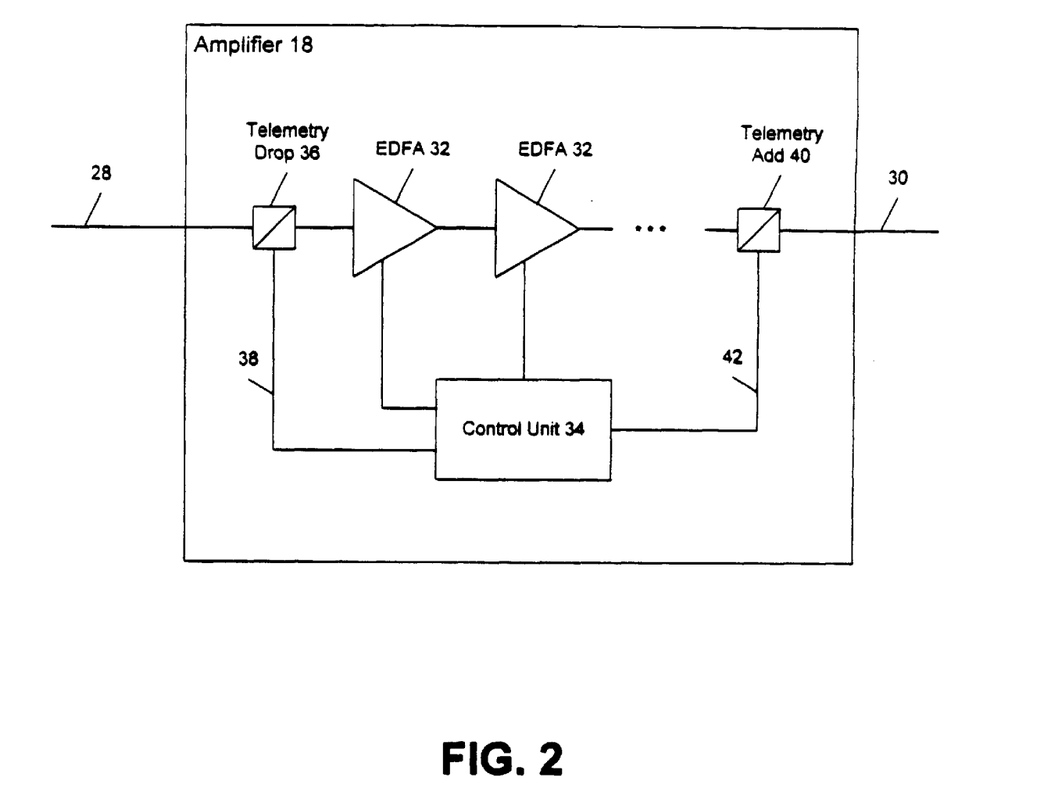
FIG. 2 is a diagram of an illustrative optical amplifier.

An illustrative optical amplifier 18 is shown in FIG. 2. Optical signals from a span of transmission fiber 16 (e.g., an 80 km span) may be provided to input 28. Amplifier 18 may be used to amplify the optical signals on each of the multiple (e.g., 40) separate channels. The amplified output of amplifier 18 may be provided at output 30.

Amplifier 18 may have multiple stages, each based on an individual rare-earth-doped fiber amplifier module. For example, amplifier 18 may include a number of erbium-doped fiber amplifier (EDFA) modules 32. Modules 32 may be monitored and controlled using a control unit 34. Control unit 34 may use any suitable control electronics such as microprocessor-based control electronics to provide monitoring and control functions for amplifier 18.

Control unit 34 may perform local monitoring and control functions such as monitoring and maintaining the proper set-point temperature for equipment that is temperature stabilized, such as optical detector components and/or fiber coils in modules 32. Control unit 34 may also include communications circuitry that allows control unit 34 to communicate with other control electronics in the network.

Any suitable arrangement may be used to allow control unit 34 to communicate with network control electronics. As an example, a telemetry channel may be provided using a particular wavelength of light. A telemetry drop filter 36 may be used to separate such a telemetry channel from the multiple data channels provided at input 28. The telemetry channel may be supplied to control unit 34 over a short length of fiber 38. A photodiode or other optical receiver in control unit 34 may be used to receive the telemetry signal. A laser diode or other suitable optical transmitter may be used in control unit 34 to transmit optical signals at the appropriate wavelength for the telemetry channel. These optical signals may be provided to telemetry add filter 40 over a short length of fiber 42. This configuration allows telemetry signals from previous amplifier stages to be provided to the control unit 34 in amplifier 18 and allows control unit 34 to transmit telemetry signals to subsequent amplifier stages.

Figure 3:
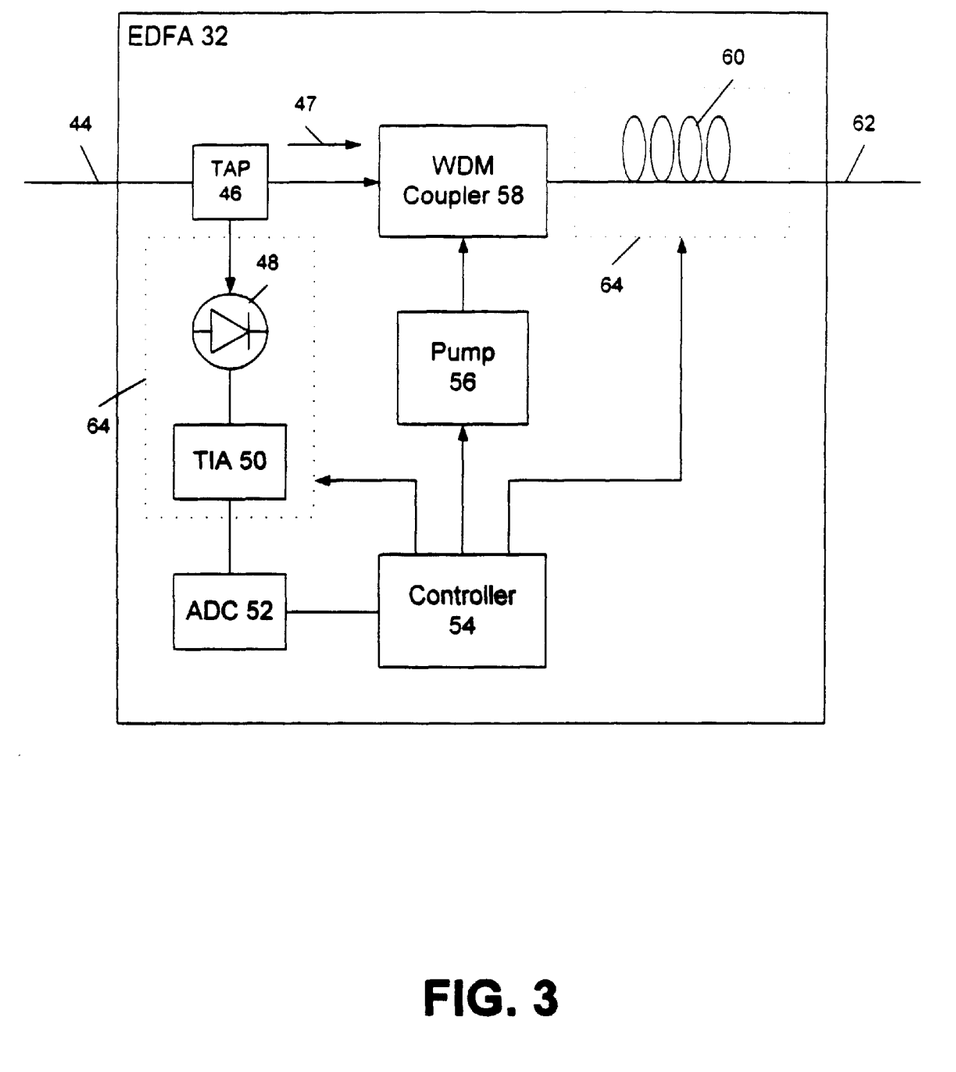
FIG. 3 is a diagram of an illustrative erbium-doped fiber amplifier module for use in the optical amplifier of FIG. 2.

An illustrative erbium-doped fiber amplifier module 32 is shown in FIG. 3. Optical signals to be amplified are provided to input 44. Amplified output signals are provided at output 62. Gain is provided by a coil of erbium-doped fiber 60 or a length of other suitably-doped fiber (e.g., fiber doped with another rare-earth element or other materials). Coil 60 may be on the order of a few meters to many meters in length. Coils such as coil 60 are typically about 5 cm in diameter and 3 mm thick, depending on the size of the thermal chamber in which they are placed, as discussed below.

As shown in FIG. 3, optical signals from input 44 are provided to an optical tap 46. Optical tap 46 may be any suitable optical tap. For example, tap 46 may be a low-loss tap that is relatively wavelength insensitive. Tap 46 may be, for example, a 2%/98% tap that directs 2% of the output power from input 44 to photodiode 48 and that directs 98% of the output power from input 44 to wavelength division multiplexing (WDM) coupler 58.

Photodiode 48, such as a PIN diode, converts optical signals received from tap 46 to electrical signals. The electrical signal may be, for example, an electric current indicative of the optical power on the input 44. While a photodiode 48 is shown in FIG. 3, it should be understood that any suitable photodetector may be used. Transimpedance amplifier 50 converts the electrical signals from photodiode 48 into a voltage signal and supplies the voltage signal to analog-to-digital converter (ADC) 52. Analog-to-digital converter 52 converts the amplified signal to a digital signal. The digital signal is input to controller 54. Responsive to the digital signal, controller 54 generates control signals to control pump laser 56. For example, the control signals may control the output power of pump laser 56. By controlling the pump laser 56, the controller 54 can control the gain experienced by light passing through the coil 60. Controller 54 may be a computer, microprocessor, application-specific integrated circuit, or other suitable control device.

The output of pump laser 56 pumps coil 60. Pump laser 56 may be any suitable pump, such as a diode laser operating at 980 nm or 1480 nm. WDM coupler 58 may be used to couple pump light from pump 56 into coil 60 while allowing optical signals (e.g., optical signals in the 1530–1560 nm wavelength range) from tap 46 that are traveling in direction 47 to pass into coil 60 for amplification. The spectral response of pumped fiber coils 60 may be flattened using a gain equalization filter (not shown).

Photodiode 48 exhibits temperature-dependent variations in its output. For example, the output current of photodiode 48 may change for a constant input optical power when the ambient temperature changes. Photodiode 48 may produce a temperature-dependent current even when no light impinges upon photodiode 48. Particularly when the optical signal to be detected has low power, the temperature-dependent current may introduce significant noise in the photodiode output current.

Similarly, the transimpedance amplifier 50 may also exhibit temperature-dependent variations in its output signal. For example, transimpendance amplifier 50 typically includes a resistor element whose resistance value affects the output voltage produced by the transimpedance amplifier 50. The actual resistance value of the resistor may vary with temperature, which causes the gain of the transimpedance amplifier to vary. As a result, for a given input value, the output voltage produced by the transimpedance amplifier varies depending on temperature.

One technique for avoiding the temperature dependency of the photodiode 48 and transimpedance amplifier 50 is to calibrate the temperature dependence of individual optical amplifiers during manufacture. According to one technique, the optical amplifier may be provided with a temperature sensor. During manufacture, the optical amplifier may be stabilized at a particular temperature and then various operational parameters of the optical amplifier may be measured. The stabilization and measurement steps may be performed for multiple temperatures. The measured values may be used to generate compensation values that are registered in software, for example, in a look-up table.

In operation, the optical amplifier may use the temperature value of the temperature sensor to adjust for the temperature dependency of that particular optical amplifier. For example, the controller 54 may receive the output of the ADC 52, adjust the ADC output based on the temperature value received from the temperature sensor and the compensation values stored in the look-up table, and then adjust the pump power based on the compensated temperature. For stable operation of amplifier stages such as fiber amplifier stage 32 of FIG. 3, photodiode 48, transimpedance amplifier 50, and coils 60 may be temperature stabilized to a predetermined set point temperature. In this regard, the photodiode 48, the transimpedance amplifier 50, and the coils 60 may be provided in a temperature-controlled housing 64, shown schematically in FIG. 3. A single temperature-controlled housing 64 may house each of the components or separate housings 64 may be provided for each component or a combination of the components. Controller 54 may be used to maintain the housing 64 at the desired temperature. Of course, the desired temperature may be adjustable manually (e.g., by a technician) or may be adjusted using software commands provided to controller 54 (e.g., from a network operator). The functions of controller 54 may be based on a dedicated temperature control circuit or other suitable hardware-oriented temperature control arrangement or may be based on a software-oriented temperature control arrangement.

In order to avoid the noise penalty associated with operating coils 60 at elevated temperatures, housing 64 may be used to maintain coils 60 at a relatively low temperature such as room temperature (20° C.) or the minimum allowed operating temperature of amplifier 18 (e.g., 0° C.) or 30 or 35° C. Photodiode 48 and/or transimpedance amplifier 50 may be maintained at the same temperature as the coils 60, or a different temperature depending on their desired operating performance characteristics. For example, photodiode 48 and/or transimpedance amplifier 50 may be maintained at a temperature in the range of 0° C. to 55° C., for example, 25° C. to 30° C.

Figure 4:
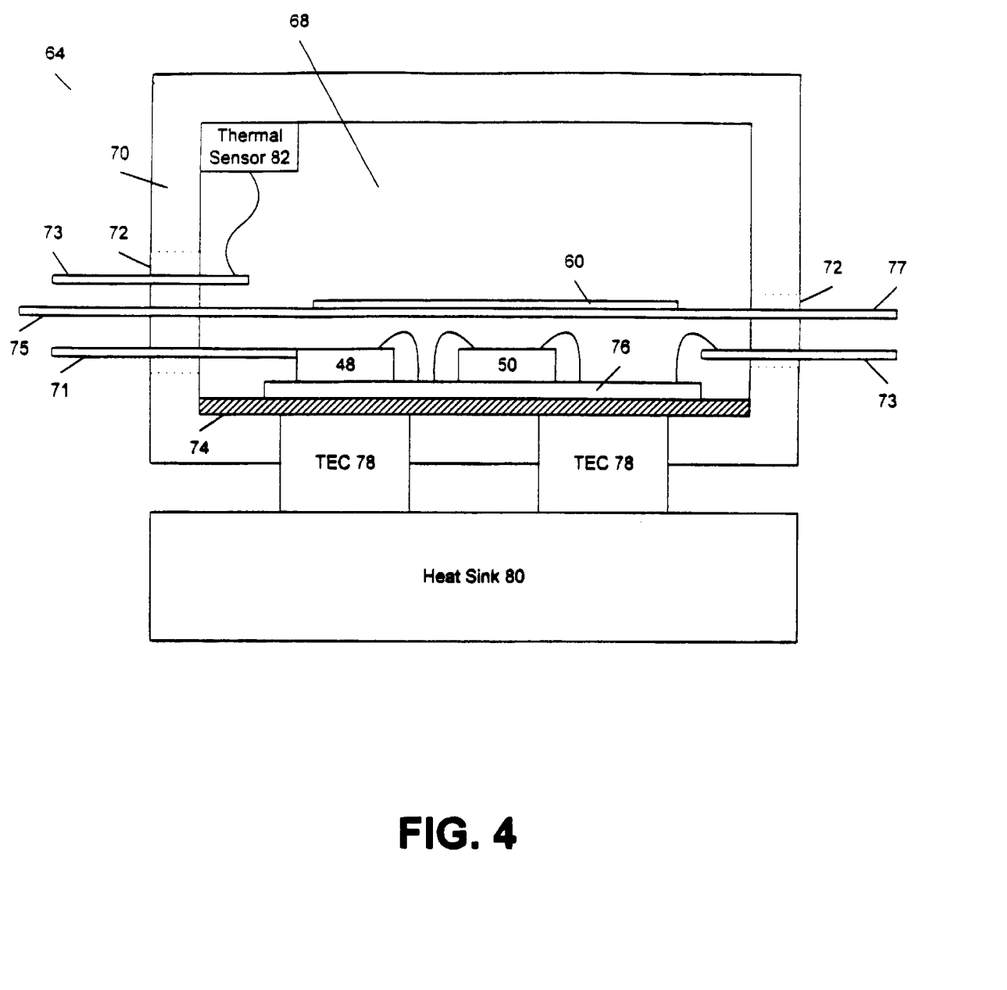
FIG. 4 is a diagram illustrating how optical detector components may be housed in a temperature-controlled housing in accordance with the invention.

A side view of an illustrative housing 64 is shown in FIG. 4. In the exemplary embodiment shown in FIG. 4, photodiode 48, transimpedance amplifier 50, and coils 60 are placed in a thermal chamber 68. The walls 70 of chamber 68 may be formed using any suitable material. For example, a thermally-insulating material such as fiberglass, foam, or plastic may be used for walls 70. Ports 72 may be formed in walls 70 to allow an input fiber 71 to photodiode 48, leads 73 to co to transimpedance amplifier 50 and other electrical components, and to allow the ends 75, 77 of fiber coils 60 to enter and exit chamber 68.

A thermal conductor 74 may be placed within chamber 68 to distribute heat or to facilitate cooling of chamber 68. If desired, photodiode 48, transimpedance amplifier 50, and/or coils 60 may rest on thermal conductor 74 or may be placed in the vicinity of conductor 74. Any suitable mounting technique may be used to fix the position of the components housed within housing 64. For example, coils 60 may be mounted in chamber 68 using epoxy or other adhesives. If desired, the epoxy used to mount the coils may be thermally-conductive epoxy. Photodiode 48 and/or transimpedance amplifier 50 may be on a submount 76. Submount 76 may include electrically-conductive traces and bonding pads to permit electrical connection to and from the photodiode 48 and the transimpedance amplifier 50.

Thermo-electric coolers may be used to cool or heat the interior of chamber 68 by transferring heat to or from thermal conductor 74. When thermo-electric coolers are used for cooling chamber 68 (e.g., when the environmental temperature in the vicinity of housing 64 is greater than room temperature), thermo-electric cooling elements 78 transfer heat from thermal conductor 74 to heat sink 80. When thermo-electric cooling elements 78 are used for heating chamber 68 (e.g., when the environmental temperature is lower than room temperature), thermoelectric cooling elements 78 may be used to transfer heat to thermal conductor 74 from heat sink 80. Heat sink 80 may be a dedicated heat sink or may be the same heat sink that is used for heat sinking the laser diode pumps in the amplifier. Heat sink 80 may be in contact with the amplifier case or may be formed using the amplifier case.

If desired, a set of cooling elements may be used to cool housing 68 and a set of separate heating elements may be used to heat chamber 68. These are merely illustrative examples. Any suitable technique may be used for cooling and heating chamber 68 if desired. For example, water-based temperature regulation arrangements may be used, air cooling may be used, refrigerant-based systems may be used, etc. One or more thermal sensors such as thermal sensor 82 may be used to gather information on the temperature of housing 64, chamber 68, photodiode 48, transimpedance amplifier 50, coils 60, and other temperature-sensitive components, if any, within the housing 64. In the example shown in FIG. 4, a thermal sensor 82 has been mounted on the interior of housing 64, so that sensor 82 may measure the temperature of chamber 68. Coils 60 are typically at the same temperature as chamber 68.

The temperature information from sensors such as sensor 82 may be provided to controller 54, which controls the operation of temperature control units such as thermo-electric coolers 78 accordingly.

The temperature information from sensors 82 may also be provided to a communications system central office or network management facility using the telemetry channel.

Figure 5:
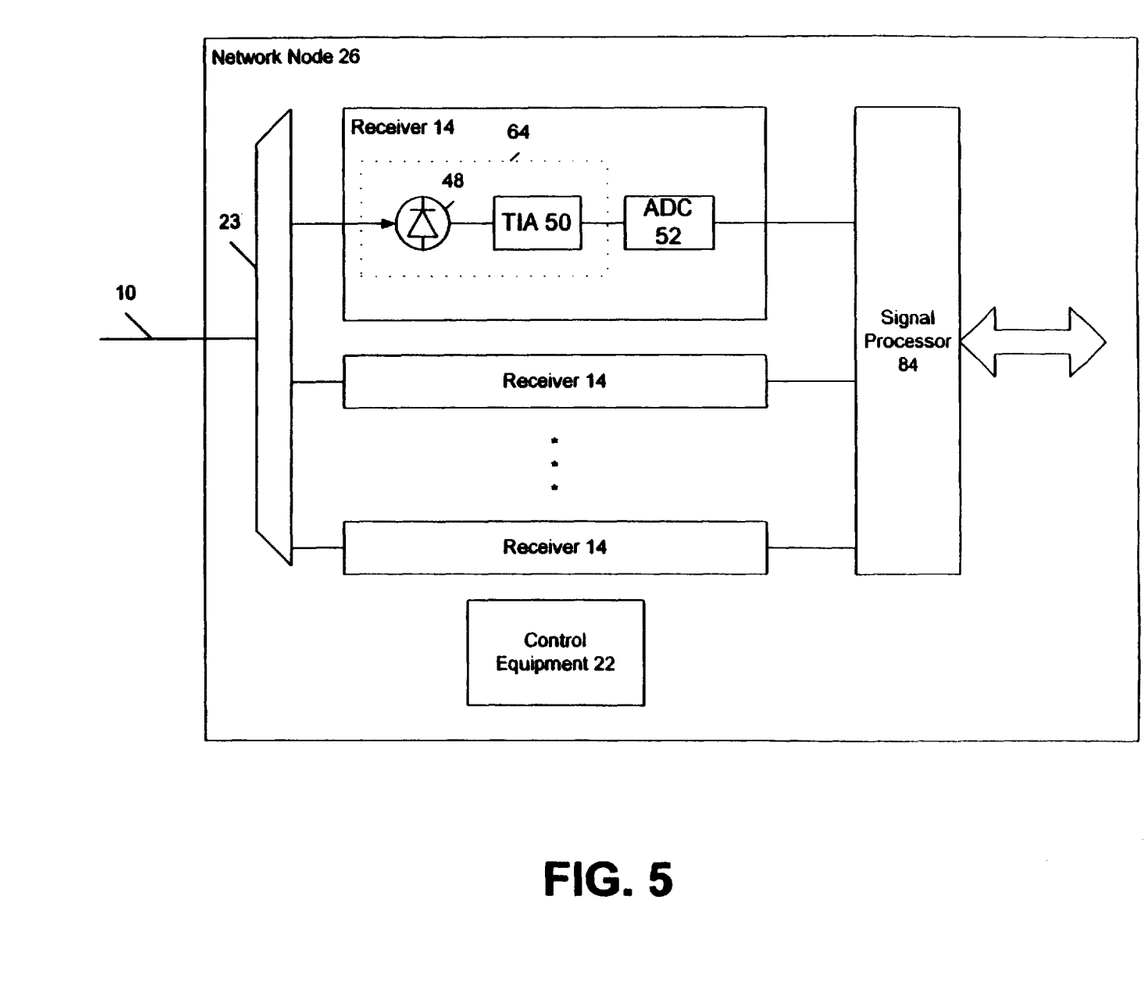
FIG. 5 is a diagram of an illustrative optical receiver in which one or more optical detector components may be housed within a temperature-controlled housing in accordance with the present invention.

FIG. 5 provides an illustrative schematic of a further embodiment of the present invention. FIG. 5 illustrates a portion of a network node 26 previously described above in connection with FIG. 1. As shown in greater detail in FIG. 5, receiver 14 may include a high-speed photodiode 48 (such as a high-speed PIN diode), a high-speed transimpedance amplifier 50, and an analog-to-digital converter 52. Photodiode 48 receives light from demultiplexer 23. Of course, other optical equipment may be disposed between demultiplexer 23 and receiver 14. For example, one or more optical switches and/or optical filters may be coupled between demultiplexer 32 and receiver 14.

Demultiplexer 23 receives WDM signals over link 10, demultiplexes the WDM signals, and supplies the demultiplexed optical signals to the respective receivers 14. Within the receiver 14, a photodiode 48 converts the received light into electrical signals, such as an electrical current. Transimpedance amplifier 50 uses the electrical signal to generate an analog voltage and supplies the analog voltage to analog-to-digital converter 52. Analog-to-digital converter 52 converts the analog voltage into digital signals and provides the digital signals to signal processor 84. Signal processor 84 may process the digital signals (e.g., error correction, control information, etc.) and distribute the processed signals as appropriate.

A temperature-controlled housing 64 may be used to house the photodiode 48 and transimpedance amplifier 50 and maintain these components at a stable temperature to avoid temperature-dependent drift.

While in the embodiment of FIG. 5, photodiode 48 and transimpedance amplifier 50 are provided within the temperature-controlled housing 64, it should be understood that only one of these components may be provided in housing 64, alone or with other components. Alternatively, separate housings 64 may be provided. Housing 64 may also be used for multiple photodiodes 48 and/or transimpedance amplifiers 50 provided at the network node 26.

The arrangement of receiver 14 illustrated in FIG. 5 may be utilized in contexts other than in a network node 26. For example, the receiver 14 may be included within control unit 34 of FIG. 2 for receiving the telemetry channel.

It will be understood that the foregoing is merely illustrative of the principles of this invention, and that various modifications can be made by those skilled in the art without departing from the scope and spirit of the invention. For example, optical signals may be amplified in other suitable wavelength ranges. Different pump arrangements and telemetry arrangements may also be used. Any suitable number of channels may be supported by the fibers in the system. The temperature maintained in the temperature-controlled housing may be the maximum operating temperature of the amplifier or any other suitable set-point temperature.

What is claimed is:

1. An optical amplifier comprising:
a tap that taps a portion of an optical signal and outputs a tapped optical signal;
an optical detector that detects the tapped optical signal to generate an analog detection signal;

a controller that receives the analog detection signal and generates a pump control signal;

at least one optical gain medium that receives an optical input signal;

an optical pump that optically pumps the optical gain medium in accordance with the pump control signal to amplify the optical input signal; and a temperature-controlled housing that houses at least a portion of the optical detector, wherein the temperature-controlled housing maintains the temperature of the portion of the optical detector within a predetermined range.

2. The optical amplifier according to claim 1, wherein the optical detector comprises a photodiode and the photodiode is housed within the temperature-controlled housing.

3. The optical amplifier according to claim 2, wherein the optical detector further comprises a transimpedance amplifier and the transimpedance amplifier is housed within the temperature-controlled housing.

4. The optical amplifier according to claim 3, wherein the optical gain medium is housed within the temperature-controlled housing and the temperature-controlled housing maintains the temperature of the optical gain medium within the predetermined range.

5. The optical amplifier according to claim 4, wherein the optical gain medium comprises a rare earth-doped optical fiber.

6. The optical amplifier according to claim 1, wherein the optical detector comprises a transimpedance amplifier and the transimpedance amplifier is housed within the temperature-controlled housing.

7. The optical amplifier according to claim 1, wherein the optical detector comprises a first component and a second component, and wherein the temperature-controlled housing houses the first component of the optical detector.

8. The optical amplifier according to claim 7, further comprising a second temperature-controlled housing that houses the second component of the optical detector.

9. The optical amplifier of claim 8, wherein the first component comprises a photodetector and the second component comprises a transimpedance amplifier.

10. The optical amplifier of claim 1, wherein the temperature-controlled housing has thermally-insulating walls.

11. The optical amplifier of claim 1, wherein the temperature controlled housing includes a thermally-conductive material that distributes heat within the housing.

12. The optical amplifier of claim 1, wherein the temperature controlled housing includes a copper plate that distributes heat within the housing.

13. The optical amplifier of claim 1, further comprising thermo-electric cooling elements for controlling the temperature of the temperature-controlled housing.

14. The optical amplifier of claim 1, further comprising a heat sink external to the housing.

15. The optical amplifier of claim 1, further comprising a temperature sensor that monitors the temperature of the housing.

16. The optical amplifier of claim 1, wherein the controller maintains the temperature of the housing at a set point temperature.

17. An optical amplifier comprising:

a tap that taps a portion of an optical signal and outputs a tapped optical signal;

an optical detector that detects the tapped optical signal to generate an analog detection signal;

a controller that generates a pump control signal in response to the analog detection signal;

at least one optical gain medium that receives an optical input signal;

an optical pump that optically pumps the optical gain medium in accordance with the pump control signal to amplify the optical input signal; and a temperature-controlled housing that houses at least a portion of the optical detector, the temperature-controlled housing including a temperature sensor that senses a temperature within the housing, wherein the temperature-controlled housing cools the portion of the optical detector within the housing if the sensed temperature increases above a predetermined temperature set point.

18. The optical amplifier module according to claim 17, wherein the optical detector comprises a photodiode and the photodiode is housed within the temperature-controlled housing.

19. The optical amplifier module according to claim 17, wherein the optical detector comprises a transimpedance amplifier and the transimpedance amplifier is housed within the temperature-controlled housing.

20. An optical receiver for a fiber optic communication system, comprising:

a wavelength-division demultiplexer for demultiplexing a received wavelength division multiplexed optical signal into a plurality of optical signals;

an optical detector for detecting one of the optical signals and generating an electronic detection signal;

a temperature-controlled housing that houses at least part of the optical detector, the temperature-controlled housing including a temperature sensor that senses a temperature within the housing, wherein the temperature-controlled housing adjusts the temperature within the housing if the sensed temperature varies from a predetermined temperature set point; and a signal processor for processing the electronic detection signal.

21. The optical receiver according to claim 20, wherein the optical detector comprises a photodiode and the photodiode is housed within the temperature-controlled housing.

22. The optical receiver according to claim 21, wherein the optical detector further comprises a transimpedance amplifier and the transimpedance amplifier is housed within the temperature-controlled housing.

23. The optical receiver according to claim 20, wherein the optical detector comprises a transimpedance amplifier and the transimpedance amplifier is housed within the temperature-controlled housing.

24. The optical receiver according to claim 20, wherein the optical detector comprises a first component and a second component, wherein the temperature-controlled housing houses the first component of the optical detector.

25. The optical receiver according to claim 24, further comprising a second temperature-controlled housing that houses the second component of the optical detector.

26. The optical receiver of claim 25, wherein the first component comprises a photodetector and the second component comprises a transimpedance amplifier.

27. A method for calibrating an optical amplifier module, the optical amplifier module including a tap that taps a portion of an optical signal and outputs a tapped optical signal, an optical detector that detects the tapped optical signal to generate a detection signal, a controller that generates a pump control signal in response to the detection signal, at least one optical gain medium that receives an optical input signal, and an optical pump that optically pumps the optical gain medium in accordance with the pump control signal to amplify the optical input signal, the method comprising:

sensing a temperature of the optical amplifier module; and generating a pump control signal that is temperature-compensated based on the sensed temperature, wherein the generating step comprises:

adjusting the detection signal based on the sensed temperature; and selecting the pump control signal using the adjusted detection signal.

28. The method of claim 27, wherein the adjusting step comprises:

determining a temperature compensation value using the sensed temperature;

subtracting the temperature compensation value from the detection signal.

29. A method for calibrating an optical amplifier module, the optical amplifier module including a tap that taps a portion of an optical signal and outputs a tapped optical signal, an optical detector that detects the tapped optical signal to generate a detection signal, a controller that generates a pump control signal in response to the detection signal, at least one optical gain medium that receives an optical input signal, and an optical pump that optically pumps the optical gain medium in accordance with the pump control signal to amplify the optical input signal, the method comprising:

sensing a temperature of the optical amplifier module; and generating a pump control signal that is temperature-compensated based on the sensed temperature, wherein the step of generating comprises:

adjusting at least a portion of the optical detector based on the sensed temperature so that the detection signal is temperature-compensated;

selecting the pump control signal using the detection signal.

* * * * *